Patented June 15, 1937

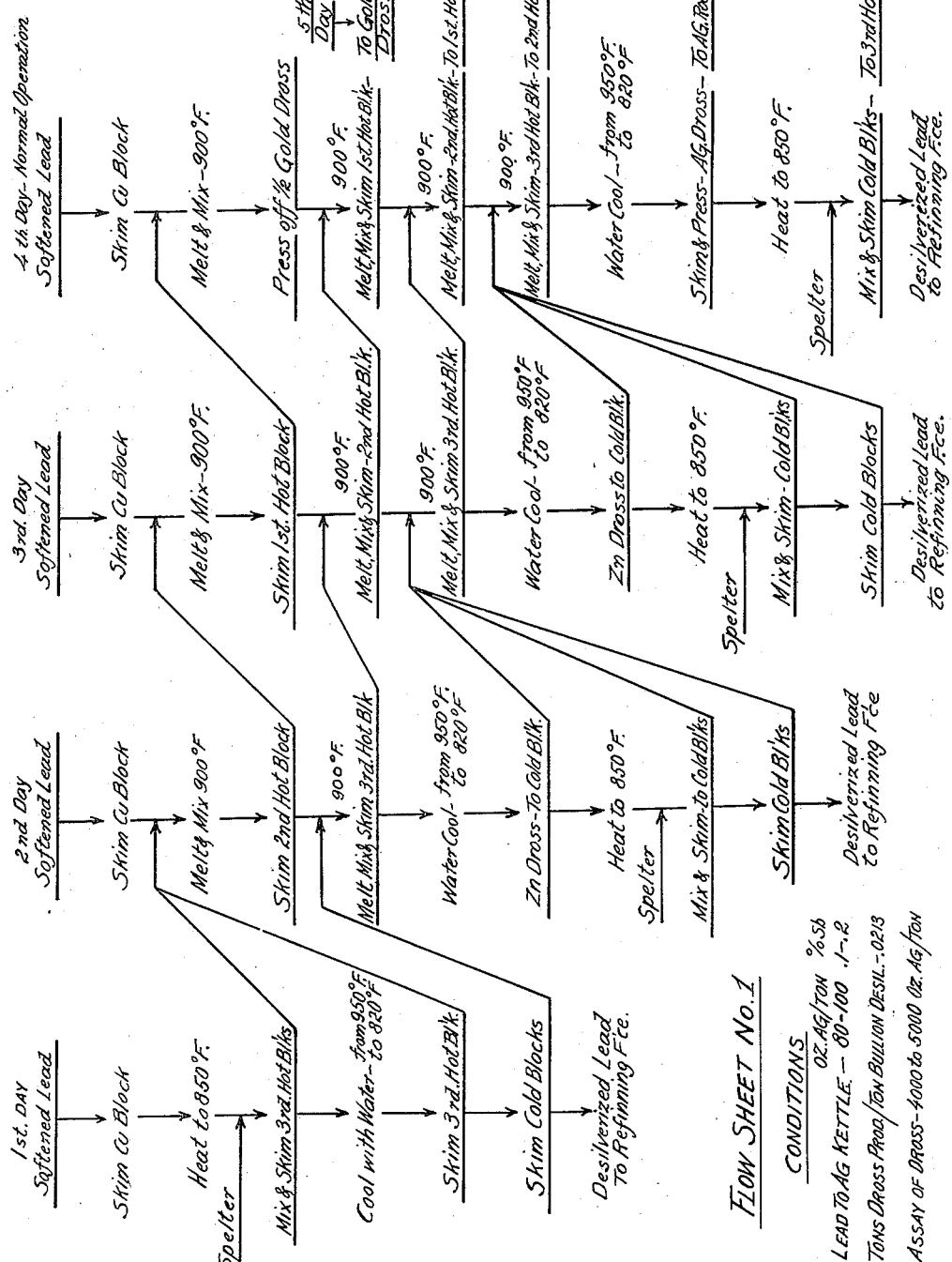

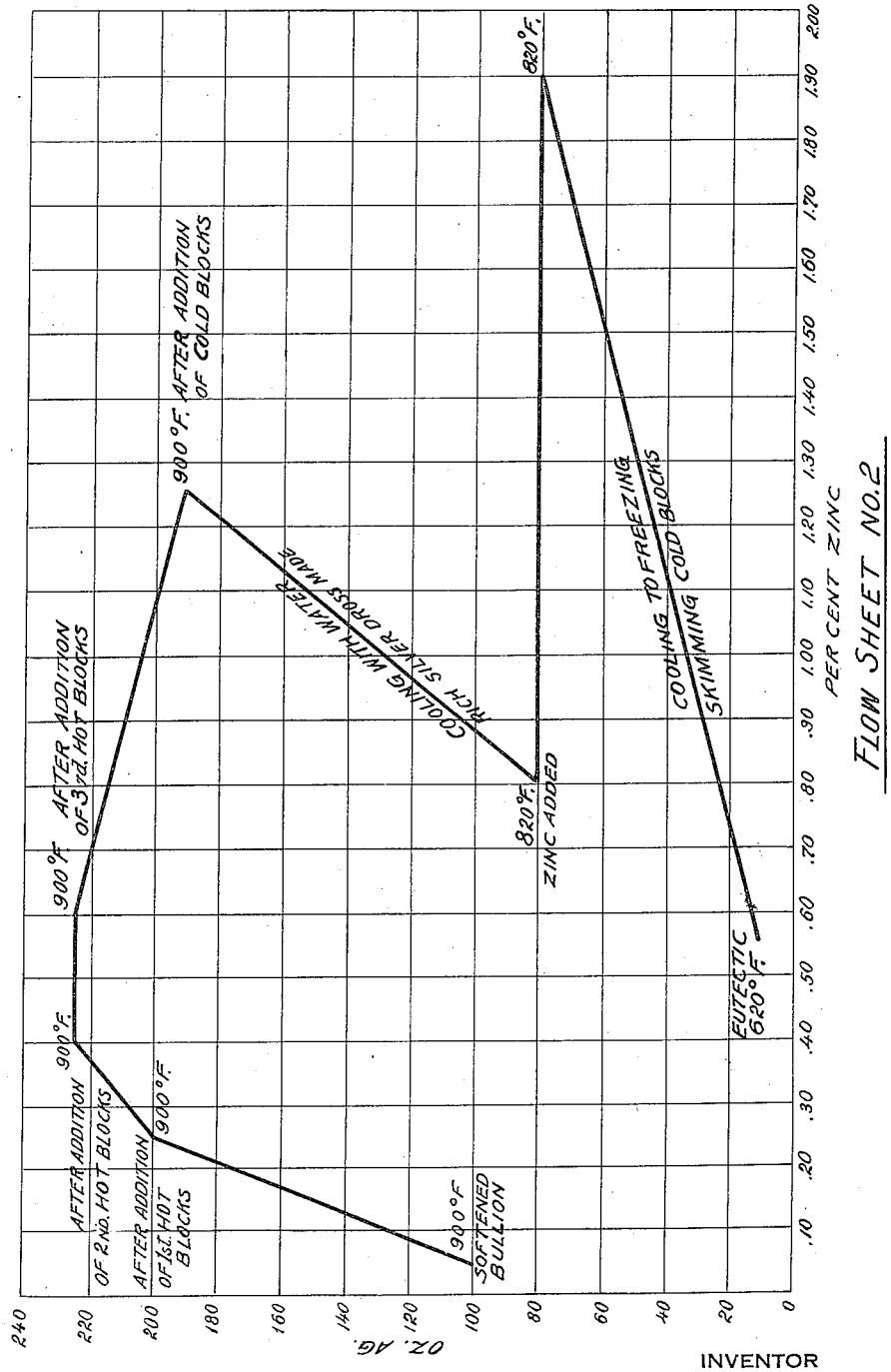

2,083,892

UNITED STATES PATENT OFFICE 2,083,892

DESILVERIZING LEAD BULLION

Frederick P. Clark, East Chicago, Ind., assignor to International Smelting and Refining Company, East Chicago, Ind., a corporation of Montana Application June 26, 1935, Serial No. 28,451

8 Claims. (Cl. 75—79)

This invention relates to lead metallurgy and has for an object the provision of an improved method of desilverizing lead bullion. A further object of the invention is to provide an improved method of desilverizing lead by means of which silver-zinc dross of higher silver content than it is possible to produce by methods employed heretofore may be obtained. In its more specific aspect, the invention relates to the manner in which the zinc is added to the metal to be desilverized, the manner in which the various drosses and blocks are removed, the control of the amount of zinc to be added, and the optimum temperatures at which the drosses are formed and removed in such a way as to improve the grade of dross produced.

In desilverizing as well as in any other refining process, it is desirable to concentrate the element or impurity to be removed into the smallest possible quantity of by-product in order that the subsequent treatment of the by-product for recovery of valuable constituents will be as simple and as inexpensive as possible. In the Parkes process of desilverizing, the silver is removed from the large bulk of the lead in a dross or skim which also contains considerable amounts of zinc and lead. This dross is subjected to further treatment for the separation and recovery of these three constituents, silver, zinc and lead. It is, therefore, apparent that the higher the percentage of silver contained in this dross the less will be the tonnage of material requiring retreatment and the less expensive and more efficient will be this retreatment.

According to the methods of desilverizing lead, the bullion after first having been softened for removal of arsenic, antimony and copper, is pumped to a desilverizing kettle. Any dross formed during the filling of the kettle is skimmed off. Cold blocks from the previous day's operation are then charged in, melted and mixed and the resulting dross pressed off and sent to retort furnaces for further treatment. After the first dross is pressed off the remaining bullion is sampled in such a manner as to accurately indicate the quantity of silver remaining which requires additional zinc for its removal. Sufficient metallic zinc is then added to satisfy the remaining silver; also additional zinc is added for saturation and for new silver entering the system in the following day's charge. This zinc is melted and mixed and the dross formed is skimmed into molds. The metal is allowed to cool slowly in the kettle to the eutectic temperature, dross being removed as it forms during the cooling operation and added to that already produced. The blocks obtained from the dross produced after the addition of the zinc, and the dross produced from cooling to freezing, constituting the cold blocks, are charged into the following day's kettle of bullion and the dross thus formed, together with what silver the excess zinc takes up from new silver entering the system, constituting the next day's zinc dross.

The foregoing describes in a general way the standard older method of desilverizing lead bullion. The silver content of the zinc dross produced by this method is dependent upon several factors, most important of which are (1) the silver-to-zinc ratio and (2) the concentration of the silver in the bullion to be desilverized. Assuming the silver-to-zinc ratio to be equal for two kettles of bullion to be desilverized, the kettle which contains the higher concentration of silver will produce the higher concentration of silver in the zinc dross. On the other hand, assuming two kettles of bullion which contain silver in equal concentrations, it would be expected that the kettle having the higher silver-to-zinc ratio would produce the higher grade of zinc dross. It is, therefore, apparent that any one method applied to different sets of conditions will not produce the same results. For example, let it be assumed that, for a bullion assaying 80 to 100 oz. Ag/ton, a certain method of drossing and addition of zinc will produce a zinc-silver dross assaying on the average of about 2,500 oz. Ag/ton. It is obvious that, following this same procedure on a bullion assaying only 8 to 10 oz. Ag/ton, it would be practically impossible to make a dross assaying as much as 2,500 oz. Ag/ton. It is, however, possible to apply my improved method of desilverizing to bullion of such low silver concentration and obtain silver-zinc drosses assaying in excess of 2,500 oz. Ag/ton.

Having briefly discussed the older methods of desilverizing and their limitation I shall now describe my improved method. The following is a clear and exact description which will enable others skilled in the art to practice the same.

In order to clarify the description and to aid others in the application of my improved method of desilverizing, reference is made to flow sheets No. 1 and No. 2 shown in Fig. 1 and Fig. 2, respectively, of the accompanying drawings. Flow sheet No. 1 illustrates the method of flow of hot and cold blocks, addition of zinc, skimming off of gold dross and silver dross, optimum temperatures and the method in which the system is built up in silver to the point where equilibrium is reached and it becomes possible to make silver dross each day of the desired silver concentration. In the special case as illustrated by flow sheet No. 1, it requires four days to build up the system in silver to the point where is is possible to make silver-zinc dross assaying 4,500 to 5,000 oz. Ag/ton from new bullion assaying from 80 to 100 oz. Ag/ton. No silver-zinc dross would be produced during this period but all the silver would go into the circulating dross blocks being formed. If the incoming bullion contained 150 oz. Ag/ton a shorter period of time would be required to bring the system to equilibrium so that it would be possible to produce the same grade of dross. In case the silver content of the incoming bullion was less than 80 oz. Ag/ton, say only 20 oz. Ag/ton, it would require several days longer to build up the system in silver but, if carried far enough, it would still be possible to make dross each day containing 4,000 to 5,000 oz. Ag/ton.

Flow sheet No. 2 shows the zinc and silver concentrations in a representative kettle of lead during different stages of the desilverizing operation. It will be seen that, for incoming bullion assaying about 100 oz. Ag/ton, the silver concentration is increased by addition of circulating hot blocks to a maximum of about 220 oz. Ag/ton and that, at the time of pressing off the rich silver-zinc dross, the metal still contains about 190 oz. Ag/ton. By following the scheme and conditions shown in these flow sheets it is possible to produce, from day to day, a rich silver-zinc dross assaying from 4,000 to 5,000 oz. Ag/ton.

Referring again to flow sheet No. 1 a specific case will be exemplified for purposes of clarity. It will be seen that the first hot blocks are charged into the kettle of softened bullion, melted and mixed for five minutes at 900° F. and about half the dross produced is pressed off as gold dross. The second hot blocks are then charged into the kettle which already contains half of the gold dross not pressed off. These blocks are melted, mixed for five minutes at 900° F. and skimmed off into blocks which are designated as first hot blocks and are charged into the following day's kettle as such. The third hot blocks are next charged, mixed at the same temperature, and skimmed into blocks designated as second hot blocks. Finally the cold blocks are charged, melted, mixed and skimmed into blocks designated as third hot blocks for the following kettle. It will be noticed that the first hot blocks charged the first day make gold dross the second day. The second hot blocks made the first day become the first hot blocks the second day; the third hot blocks become the second hot blocks and the cold blocks become the third hot blocks the following day. At this stage, when the cold blocks have been charged, melted, mixed and skimmed off as third hot blocks, the rich silver-zinc dross is made.

The silver-zinc dross is made in the following manner: Water is sprayed onto the surface of the bath of metal in the kettle until the desired amount of frozen crust is produced. During the addition of water and the pressing off of the rich silver-zinc dross the temperature of the kettle is allowed to cool to about 820° F. at which temperature the last of the rich dross is removed. After the cooling with water, the rich silver-zinc dross is skimmed and pressed off. The kettle is then mixed for five minutes and "hot" and "cold" samples taken. The assay of the "cold" sample represents the silver in the kettle that requires additional zinc to remove it. Additional zinc is added to satisfy the new silver entering the system in the next day's charge.

According to the preferred method of my invention, the molten metal is at a temperature of about 950° F. after removal of the third hot blocks and before cooling to effect the production of a rich silver-zinc dross is commenced. Upon standing, a two layer system is established, consisting of a surface layer of comparatively small thickness of an alloy of high silver content, and a comparatively large lower mass of metal of low silver content. The entire mass is cooled gradually, and, as cooling progresses to temperatures below 950° F., crystals of high grade silver-zinc alloy appear. The cooling is discontinued when the metal reaches a temperature of about 820° F., and the high grade silver-zinc crystals are skimmed off. Gradual cooling is necessary for the most effective separation. Cooling may be accomplished in any suitable manner, but I prefer to use water for cooling purposes. The crystals of rich alloy, as formed, float on the surface of the molten mass of metal in a semi-fluid metal layer and they are only slightly different in physical properties from the remainder of the metal. The application of a water spray to the surface effects chilling, increasing the difference in physical properties and permitting a comparatively clean separation of the crystals from the remainder of the metal by skimming.

Referring again to the flow sheets, it will be seen that the cold blocks obtained from the final cooling of the metal to remove the last traces of silver are returned to the next day's kettle and are skimmed off as the third hot blocks. During their passage through this cycle some of the silver-zinc alloy which they contain redissolves in the bath of silver-lead; the excess zinc takes up more silver and thereby enriches the bath of metal. Numerous experiments have been made to determine whether the solubility of the silver-zinc alloy would increase with an increase in temperature. This was found to be true to some extent. However, the temperature is naturally limited for the reason that, when operating at temperatures above 900° F., the second hot blocks produced from the third hot blocks would become so dry that they could not be skimmed off into blocks but had to be taken off in powdery form similar to the gold dross. When this condition occurs there is produced a large amount of low grade gold dross containing excess lead and zinc which has to stand an additional treatment cost. Experience has shown that, if the temperature is not allowed to go above 900° F. when blocks are added, the dross will not become dry.

The literature indicates a great deal of discussion and experimentation as to whether compounds or conjugate solutions are formed when zinc is added to silver bearing lead. Although most of the zinc-lead solubility curves indicate that lead must contain at least 4% zinc at 850° F. before the conjugate solution area is reached, more recent investigation has shown that a 2% zinc content is sufficient to produce this condition. As to whether the silver-zinc alloy exists as a compound or as a solid solution is of little importance here. It is important, however, to determine the conditions under which the separation of the silver-zinc alloy is possible. Experiments made with this object in view indicated that with about 1.2% zinc in the lead a layer is formed in the top 2 inches of a kettle of lead which contains the rich silver-zinc alloy; below this level the silver contents are very low.

From the information obtained by experiment, it was evident that at a temperature of 950° F. the mixture will be a two-layer system. As the metal is cooled, a new phase appears, that is, solid crystals of high grade silver-zinc alloy. During cooling, the silver content of the mother liquor decreases until a temperature of 820° F. is reached. At this point cooling is stopped and the solid crystals of the rich silver-zinc alloys are pressed off. As these solid crystals contain a considerable amount of mechanically entrained low silver-zinc alloy crystals, the higher the temperature when making the silver crust the lower will be the amount of entrained low grade material and the richer will be the dross. Numerous experiments have verified these results but due to practical operating conditions the working temperatures are necessarily limited.

By again referring to the accompanying flow sheets it will be seen that a certain amount of dross is removed from the system which is termed gold dross because it contains practically all of the gold which comes into the system from new bullion. In addition to the gold this dross also contains all of the copper, tellurium and arsenic contained in the incoming bullion. The removal of this dross at the very start of the desilverizing operation serves a two-fold purpose. One reason is that it removes the gold in a separate concentrated product which, if desired, could be treated separately to make a high gold dore' bullion. The second and more important reason is that in addition to gold all other impurities except possibly antimony are removed thereby leaving the bullion free of all objectionable impurities when the rich silver-zinc dross is pressed off. This is an important factor when making 5,000 oz. silver dross from 90 oz. bullion. By means of the system of circulation of drosses as explained herein, any copper, arsenic or tellurium, as well as gold, that may have been contained in the original bullion will have accumulated in the hot blocks and finally find its way out of the system in the gold dross. The third hot blocks will contain a small amount of these impurities and more will be contained in the second hot blocks and a still larger concentration will be found in the first hot blocks.

Another important advantage my improved method of desilverizing has over the older method is that it is unnecessary to completely remove the antimony before desilverizing. As mentioned above, antimony is the one impurity which is present when the silver dross is made. When desilverizing by the older method, bullion containing 0.3 to 0.4% Sb produced a soft mushy silver-zinc dross which was very difficult to press. It contained a larger proportion of entrained lead and, therefore, less silver per unit of weight. The result was that subsequent treatment costs were excessively high and necessitated strict adherence to the practice of removing all of the antimony prior to desilverizing. On the other hand, following my improved method as described here, it has been found that antimony does not interfere with the desilverizing operation. This has been demonstrated and confirmed by desilverizing bullion containing 0.3 to 0.6% Sb on several occasions with excellent results. As a matter of fact the dross produced when working with bullion containing a little antimony has been found to be somewhat higher in silver content than that made from bullion free of antimony due, it is believed, to the lowering of the freezing point by the presence of antimony and the tendency for more lead to liquate out of the silver dross during pressing.

The reason for my ability to successfully desilverize bullion containing up to 0.6% Sb by my improved method where it could not be carried out satisfactorily by the older method is not clearly understood at the present time. The absence of other impurities such as arsenic, copper, tellurium and gold at the time of pressing off the rich silver dross by the improved method may be an important factor in this connection. As compared with the silver-zinc dross produced by the older method of desilverizing, the silver-zinc dross made by my improved method seems to be more of a homogeneous solid from which the excess lead liquates readily on pressing. When desilverizing by the older method, if from 0.2 to 0.6% Sb was present, the dross formed was soft and sloppy and it was practically impossible to press because the dross queezed through the perforations in the press when pressure was applied. Thus, the character of the dross formed by my improved method may be another factor which makes it possible to desilverize bullion containing several tenths percent antimony.

As mentioned previously, the silver content of the dross is also, in part at least, governed by the silver-to-zinc ratio of the metal at the time the dross is made. Experiments have shown that, if the silver dross was made after adding the new zinc (spelter), the silver-to-zinc ratio was low and consequently the silver content of the dross was low. According to my improved method as now being practiced, addition of water and formation of the rich silver dross is made just before addition of the new zinc. It is possible by this method to produce dross assaying from 4,500 to 5,000 oz. Ag/ton with 185 oz. Ag/ton and 1.25% Zn in the metal before water cooling and pressing. When operating by the older method the metal normally contained 1.2% Zn and from 60–80 oz. Ag/ton. This would give a lower silver-to-zinc ratio and is one factor which is responsible, to a large extent, for the lower grade dross produced by the older methods.

According to my improved method of desilverizing, two zinc additions preferably are made. One addition is made in the form of cold blocks from the previous day's operation before the rich silver dross is made and the second addition in the form of new zinc or spelter after the silver dross has been pressed off. The blocks made from the second zincing are returned to the following day's charge at which time a portion of the zinc and silver re-dissolves in the lead which has already been enriched by the previously added hot blocks.

In brief, it would be possible, within certain limits, by my improved method to produce a rich silver dross assaying 4,500 to 5,000 oz. Ag/ton irrespective of the silver content of the bullion to be desilverized if conditions at the time of pressing off the silver dross were adjusted to give a silver-to-zinc ratio proportional to about 185 oz. Ag/ton and 1.1 to 1.25% Zn in the metal. On the other hand, it would be possible to produce a richer silver dross from any given grade of bullion by increasing the silver-to-zinc ratio in the metal just prior to pressing off the rich dross. Either one of these possibilities may be accomplished by adjusting the circulating silver load in such a manner as to meet these requirements. Obviously, there are certain limitations governing the practical application. For example: it would be possible but probably not practical to produce a silver dross assaying 4,500 oz. Ag/ton from incoming bullion assaying only 8 or 10 oz. Ag/ton because a very large quantity of circulating silver, lead and zinc would be tied up and, secondly, the amount of dross of this grade produced would be extremely small. However, it would be practical to desilverize a bullion of this grade by my improved method by allowing the silver crusts to accumulate and become richer in silver and periodically treat these crusts to produce a rich silver dross assaying in the neighborhood of 4,500 oz. Ag/ton.

Referring again to flow sheet No. 2, it will be seen, by following the cycle through which the various blocks travel, that the metal gradually increases in zinc and silver contents up to the time the third hot blocks are added and skimmed off. At this point the metal contains about 0.6% Zn and about 225 oz. Ag/ton. After the cold blocks have been charged in and skimmed off the metal will have a zinc content of about 1.25% and about 190 oz. Ag/ton.

As the cold blocks represent new zinc added to the system minus the amount necessary for saturation and the small amount necessary to clean the kettle, it is evident that a great deal of free zinc and silver-zinc alloy dissolves in the lead thereby raising the silver and zinc concentrations. This same phenomenon occurs when the first, second and third hot blocks are charged. The following tabulation is representative of average conditions starting with softened bullion assaying 110 oz. Ag/ton.

|  | Oz. Ag/ton | % Zn |
| --- | --- | --- |
| Metal after 1st hot block, charged, mixed and skimmed off | 199.3 | 0.23 |
| Metal after 2nd hot blocks | 226.3 | 0.39 |
| Metal after 3rd hot blocks | 225.3 | 0.60 |
| Metal after cold blocks | 190.0 | 1.25 |

The advantages of my improved method of desilverizing will be clearly understood by reference to the following table of comparison, the data comprising which are representative of actual plant operations:

|  | Old method | Improved method |
| --- | --- | --- |
| Tons bullion desilverized | 29,554.7 | 13,701.26 |
| Avg. assay bullion charged, oz. Ag/ton | 81.52 | 87.40 |
| Tons rich silver-zinc dross produced | 1,110.20 | 292.4 |
| Avg. tons dross per ton bullion desilverized | .0376 | .0213 |
| Avg. assay silver dross produced, oz. Ag/ton | 2,170.2 | 4,095.5 |

It will be seen that the average assay of the silver dross produced by my improved method is practically double that obtained by the older method while the average assay of the bullion desilverized by the improved method is only slightly higher than the average assay of the bullion desilverized by the older method. As a result of this only about half as much silver dross is required to be retreated for separation and recovery of Ag, Zn, and Pb. A corresponding reduction in the quantity of by-products from this retreatment is accomplished, all of which has resulted in a very substantial saving.

As previously pointed out, this invention is not limited to the treatment of any particular grade of lead bullion but the principle may be applied to bullion of any doré assay without departing from the spirit of the invention.

I claim:—

1. In lead bullion desilverizing operations involving the treatment of successive batches of bullion with zinc while molten to produce silver-zinc dross, the improvement which comprises incorporating in a batch of bullion undergoing treatment the silver-zinc dross produced in treating one or more preceding batches of bullion, thereby to increase the proportion of silver in the bullion undergoing treatment, removing dross from the bullion undergoing treatment at a temperature of about 900° F., cooling the residual bullion, removing a rich silver dross from the cooled bullion, and utilizing the dross obtained prior to cooling in the treatment of additional bullion.

2. In lead bullion desilverizing operations involving the treatment of successive batches of bullion with zinc while molten to produce silver-zinc dross, the improvement which comprises incorporating in a batch of bullion undergoing treatment the silver-zinc dross produced in treating one or more preceding batches of bullion, thereby to increase the proportion of silver in the bullion undergoing treatment, removing dross from the bullion undergoing treatment at a temperature of about 900° F., cooling the residual bullion to a temperature of about 820° F., removing a rich silver dross from the cooled bullion, mixing zinc with the residual bullion, cooling the resulting mixture to a temperature of about 620° F., removing dross in cooling to 620° F., and utilizing the drosses obtained before and after removal of the rich silver dross in the treatment of additional bullion.

3. In lead bullion desilverizing operations involving the treatment of successive batches of bullion with zinc while molten to produce silver-zinc dross, the improvement which comprises incorporating in the bullion undergoing treatment one or more hot blocks produced in the treatment of a preceding batch, removing a hot block from the bullion undergoing treatment after the incorporation therein of each hot block from the preceding batch, incorporating in the residual bullion a cold block produced in the treatment of a preceding batch, cooling the resulting mixture, removing a rich silver dross from the cooled mixture, incorporating zinc in the residual bullion after removal of the rich silver dross, cooling the resulting product, removing a cold block, and utilizing the hot and cold blocks thus obtained in the treatment of additional bullion.

4. In lead bullion desilverizing operations involving the treatment of successive batches of bullion with zinc while molten to produce silver-zinc dross, the improvement which comprises incorporating in the bullion undergoing treatment first, second and third hot blocks obtained in the treatment of a preceding batch, removing gold dross after incorporation of the first hot block, removing a hot block after incorporation of each of the second and third hot blocks, incorporating in the residual bullion a cold block produced in the treatment of a preceding batch, removing a hot block after incorporation of the cold block, cooling the residual bullion, removing a rich silver dross from the cooled bullion, mixing zinc with the resulting product, and removing a cold block from the resulting mixture.

5. An improved method of desilverizing lead bullion consisting of addition of first, second and third hot blocks to a kettle of silver-bearing lead, skimming off of gold dross, first and second hot blocks, addition of cold blocks and removal of third hot blocks, cooling with water to about 820° F., skimming off a rich silver dross, addition of metallic zinc, cooling the metal to its freezing point and skimming off cold blocks, thereby producing a gold dross containing most of the gold, arsenic, copper and tellurium together with some silver, zinc and lead and a rich silver dross substantially free of impurities with some zinc and lead and a desilverized lead, substantially as described.

6. In lead bullion desilverizing operations involving the treatment of successive batches of bullion with zinc while molten to produce silver-zinc dross, the improvement which comprises increasing the concentration of silver in the bullion and establishing in the bullion a predetermined silver to zinc ratio by adding to the bullion silver-zinc dross produced in treating one or more preceding batches of bullion and removing dross from the thus treated bullion, after each addition of silver-zinc dross from a preceding treatment, without lowering the temperature of the bullion substantially, and cooling the residual bullion to produce a rich silver-zinc dross.

7. In lead bullion desilverizing operations involving the treatment of successive batches of bullion with zinc while molten to produce silver-zinc dross, the improvement which comprises increasing the concentration of silver in the bullion and establishing in the bullion a predetermined silver to zinc ratio by adding to the bullion silver-zinc dross produced in treating one or more preceding batches of bullion and removing dross from the thus treated bullion, after each addition of the silver-zinc dross from a preceding treatment, without lowering the temperature of the bullion substantially, and cooling the residual bullion slowly with water to permit the separation of a high-grade silver-zinc alloy.

8. In lead bullion desilverizing operations involving the treatment of successive batches of bullion with zinc while molten to produce silver-zinc dross, the improvement which comprises increasing the concentration of silver in the bullion and establishing in the bullion a predetermined silver to zinc ratio by adding to the bullion silver-zinc dross produced in treating one or more preceding batches of bullion and removing dross from the thus treated bullion, after each addition of silver-zinc dross from a preceding treatment, without lowering the temperature of the bullion substantially, the silver to zinc ratio established being such that upon cooling of the bullion a silver-zinc dross containing not less than about 4,000 ounces of silver per ton will separate, and cooling the bullion to effect the separation of a rich silver-zinc dross.

FREDERICK P. CLARK.